United States Patent [19]

Mikyska et al.

[11] Patent Number: 5,060,151
[45] Date of Patent: Oct. 22, 1991

[54] SPEED CONTROL FOR ORBITAL SHAKER WITH REVERSING MODE

[75] Inventors: Glenn E. Mikyska, Naperville; William W. Stanley, Batavia, both of Ill.

[73] Assignee: Cymatics, Inc., Naperville, Ill.

[21] Appl. No.: 642,707

[22] Filed: Jan. 17, 1991

Related U.S. Application Data

[63] Continuation of Ser. No. 376,902, Jul. 5, 1989, abandoned, which is a continuation of Ser. No. 62,265, Jun. 15, 1987, abandoned, which is a continuation-in-part of Ser. No. 632,574, Jul. 19, 1984, Pat. No. 4,673,297.

[51] Int. Cl.⁵ .......................... G06F 15/46; B01F 11/00
[52] U.S. Cl. .................................. 364/400; 318/260; 318/281; 364/174; 366/208; 366/601
[58] Field of Search .................. 364/130, 167.01, 174, 364/183, 400; 318/561, 596, 256-260, 268-272, 263, 276, 280-285; 388/802, 810, 845; 366/601, 110, 111, 208-213, 218, 219, 237, 240

[56] References Cited

U.S. PATENT DOCUMENTS

| | | | |
|---|---|---|---|
| 2,255,799 | 9/1941 | Meinzer | 366/111 |
| 2,500,293 | 3/1950 | O'Connor | 414/519 |
| 2,756,973 | 7/1956 | Dostatni | 74/26 |
| 2,793,010 | 5/1957 | Menken | 366/208 |
| 3,173,664 | 3/1965 | Isaacson et al. | 366/111 |
| 3,297,304 | 1/1967 | Wahl | 366/109 |
| 3,310,292 | 3/1967 | Moore | 366/111 |
| 3,416,054 | 12/1968 | Galles | 318/281 X |
| 3,599,062 | 8/1971 | Crane et al. | 318/281 |
| 3,871,623 | 3/1975 | Boenisch | 366/111 |
| 4,061,315 | 12/1977 | Eitzen et al. | 366/111 |
| 4,109,319 | 8/1978 | Brandt | 366/219 |
| 4,118,801 | 10/1978 | Kraft et al. | 366/111 |
| 4,146,922 | 3/1979 | Brown et al. | 364/174 |
| 4,147,967 | 4/1979 | Aiena | 318/341 |
| 4,202,634 | 5/1980 | Kraft et al. | 366/111 |
| 4,276,672 | 7/1981 | Teague, Jr. et al. | 173/73 X |
| 4,305,668 | 12/1981 | Bilbrey | 366/111 |
| 4,367,435 | 1/1983 | Bailey et al. | 318/280 X |
| 4,403,867 | 9/1983 | Duke | 366/142 |
| 4,481,457 | 11/1984 | Zach et al. | 318/811 X |
| 4,494,204 | 1/1985 | Hösel | 364/470 |
| 4,513,232 | 4/1985 | Safiuddin | 364/174 X |
| 4,570,110 | 2/1986 | Bloom et al. | 318/314 X |
| 4,591,969 | 5/1986 | Bloom et al. | 364/174 X |
| 4,689,533 | 8/1987 | Yang | 318/285 X |
| 4,701,743 | 10/1987 | Pearlman et al. | 318/282 X |

FOREIGN PATENT DOCUMENTS

| | | |
|---|---|---|
| 0077455 | 4/1983 | European Pat. Off. |
| 0140424 | 5/1985 | European Pat. Off. |
| 2506345 | 11/1982 | France |
| 8600995 | 2/1986 | Int'l Pat. Institute |
| 2155347 | 9/1984 | United Kingdom |

OTHER PUBLICATIONS

Patent Abstracts of Japan, vol. 7, No. 35 (P-175)(1180), Feb. 10, 1983 & JP-A-57 187 717 (Hitachi Seisakusho K.K.) 18-11-1982.

Primary Examiner—Joseph Ruggiero
Attorney, Agent, or Firm—Fitch, Even, Tabin & Flannery

[57] ABSTRACT

An orbital shaker apparatus which has a tray for cyclic motion is flexibly suspended from a frame which is flexibly suspended from a plurality of stationary supports. The flexible suspension constrains the tray to move only translationally along one axis with respect to the frame and constrains the frame to move only translationally along one axis perpendicular to the tray movement axis. A single chip microprocessor is used to scan, input store, display and control the speed, duration and control functions for the orbital motion. Embodied in the software of the microprocessor is a real-time closed loop speed control which monitors the actual speed of the orbital motion thru an interrupt facility by calculating the duration of pulses received from an optoelectric sensor. The measured pulse duration is digitally compared to the desired duration and a digital control signal is provided to drive a DC motor which is directly coupled to the drive shaft which imparts the motion. A set speed mode and a reversing mode are selectable by an operator to provide different means for agitation.

37 Claims, 6 Drawing Sheets

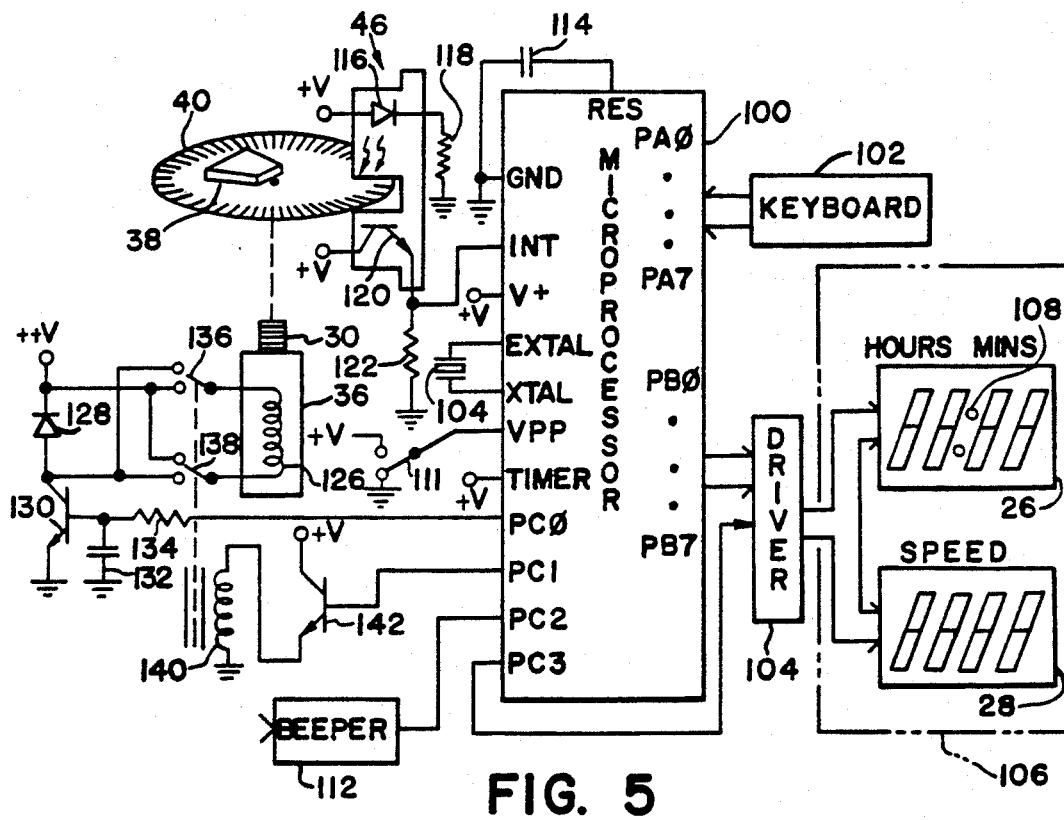
FIG. 5
| KEY | CODE Ø-7 |
|---|---|
| START | ØC |
| STOP | 14 |
| REV MODE | 15 |
| CHANGE SPEED | 06 |
| CHANGE TIME | 05 |
| 1 | CØ |
| 2 | AØ |
| 3 | 9Ø |
| 4 | 84 |
| 5 | 82 |
| 6 | 48 |
| 7 | 28 |
| 8 | 18 |
| 9 | ØC |
| Ø | ØA |
FIG. 6
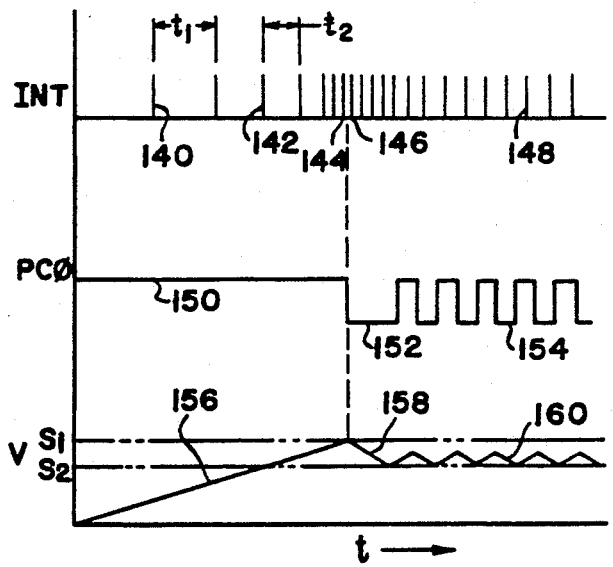
FIG. 8

SPEED CONTROL FOR ORBITAL SHAKER WITH REVERSING MODE

This application is a continuation of application of Ser. No. 376,902 filed July 5, 1989 abandoned, which is a continuation of Ser. No. 062,265, filed June 15, 1987, which is a continuation-in-part of application Ser. No. 632,574, now issued U.S. Pat. No. 4,673,297, filed July 19, 1984, in the names of Siczek, et al. entitled "Orbital Shaker" and assigned to the assignee of the present application.

CROSS REFERENCE TO RELATED APPLICATIONS

The disclosure of Siczek et al. is hereby expressly incorporated by reference.

BACKGROUND OF THE INVENTION

The present invention pertains generally to a speed control for agitation apparatus or the like, and is more specifically directed to a speed control for such agitation apparatus which is used in a laboratory environment to agitate an assay with a generally orbital motion and which incorporates a reversing mode.

In certain laboratory applications, it is desirable to move beakers, test tubes, or other containers which contain biological assays in an orbital path with a uniform motion. This uniform motion may also include a uniform speed so as to enable comparisons of the results of the mixtures achieved for different runs of the apparatus. In other words, it is desirable to move a first batch of assays in an identical motion, and for an identical number of cycles, as that of a second group of assays. The advantage of this uniformity is that it contributes to the elimination of another variable in the test and thus a source of error in a clinical assay. Therefore, precision and reproducibility are key goals in these clinical mixing apparatus.

In the past, apparatus for achieving such orbital motion for the mixing and agitation of clinical assays have not provided particularly good reliability in terms of the repetition of speed and number of cycles. Further, known apparatus for providing this type of motion have typically been quite noisy, which is undesirable in a laboratory atmosphere. Along with the problems of reliability, known orbital mixers have not been very precise. The control of these orbital shakers has generally been dependent upon analog circuitry and, accordingly, variations in speed and timing are very difficult to predict because of the variation in the precision of the control circuitry. One area of particular difficulty has been the precision with which the orbital velocity can be controlled because of the analog type circuitry used to drive the apparatus.

One of the uses of such an apparatus has been to move cultures growing in beakers in an orbital motion, such that their interiors will provide an environment for the controlled growth of the cultures. This use requires that the motion imparted to the culture containers be relatively gentle and that the paths of the containers be substantially circular, so as to produce a uniform agitation. The uniformity of the agitation and control of the velocity are important to maintain the similar growth rates of the cultures from one batch to another and from one container to another in the same batch. Although many of the uses for orbital shakers are in the medical area, other uses are common for these devices and exist in a wide variety of applications where agitation is necessary.

An orbital shaker apparatus providing a smooth and reproducible orbital motion for such assays is more fully illustrated in the above-referenced Siczek et al. patent. The apparatus comprises a movable tray for supporting articles which are to be agitated such as clinical assays in beakers, flasks, test tubes or the like. The tray is supported by a suspension system which provides support for the loading of the tray with an assay while permitting a cyclic movement in the plane of the tray without undue resistance. The suspension system constrains the tray to move in translational modes only so that there is no rotation of the plane of the tray and every point on the tray subscribes substantially the same path. The translational constraints of the apparatus are provided by a suspension system which suspends the tray from a frame with flexible supports. The flexible supports are constrained so as to be flexible only in one dimension, and permit movement of the tray only along one axis with respect to the frame. The frame is suspended by flexible supports from a plurality of stationary stands so that it is constrained to translational movement along an axis perpendicular to the tray movement axis. The combination of the translational movements of the tray and the frame allow the tray to be moved in any number of precise cyclic or orbital motions. Because all the movement is produced by the bending of the flexible supports, there are no mechanical surfaces to rub together to create noise, friction, or tolerance errors.

An advantageous direct drive control is used to impart the cyclic motion to the tray. In the preferred embodiment, a motor has its shaft mounted substantially perpendicular to the plane of the tray. The motor is coupled to the tray by a drive pin which is set eccentric to the shaft on a counterweight to produce a circular orbit around the shaft and thereby a circular orbit of each point on the plane of the tray. This apparatus utilizing a speed control for the motor provides the desired and reproducible gentle agitation of the media for normal shaker operations.

However, in other laboratory or clinical applications a more intense agitation may be required. This mode of operation may be useful for initial mixing or where the assay requires faster dispersal and/or combination between the components in the media. Many processes will be facilitated by such intense agitation as such action will shorten the cycle times necessary for many chemical reactions. Of course, a gentle and smooth transition from start to finish is still required along with precise control of the consistency of the operation, i.e., timing and orbit.

SUMMARY OF THE INVENTION

The invention provides an improved speed control for an orbital shaker apparatus which is quiet in operation, and in one mode reliably produces an orbital or cyclic motion at a set speed for a predetermined amount of time. In addition to controlling the orbital shaker apparatus at a set speed, the invention provides a reversing mode which can be selected for more intense agitation of the assays.

In a preferred embodiment, a microprocessor based controller is provided to precisely control the speed of the cyclic motion and the duration of the motion. The controller receives a speed set command and a time set command from an operator through an input port and converts these commands into digital values which may be stored in the memory of the microprocessor. The microprocessor includes an interrupt input which receives pulses from an optoelectric sensor at a frequency determined by the actual speed of the motor.

The microprocessor calculates the actual speed of the motor by counting the clock pulses of a high speed clock during the intervals between pulses. The actual speed of the motor is compared to the stored speed set value and a digital drive signal of one level is output from an output port of the microprocessor, if the set speed is less than the actual speed, and a second level is output, if the set speed is greater than the actual speed. The drive signal turns the motor fully on with one level and fully off with the second level to provide an advantageous digital speed control.

The microprocessor in response to a start signal initiates the speed control and stores a reference time from a real time clock indicating when the process was started. In addition, the preset time duration from the time set command is compared against the real time clock and the starting value to determine when the requested time duration has elapsed. The microprocessor terminates the speed control and stops the apparatus at the end of the duration or when a stop signal is generated.

According to another aspect of the invention, a reversing mode of the speed control can be selected by an operator input to the microprocessor. The motor is connected to a drive circuit which is adapted to control motion of the motor in either direction based on a bi-level direction signal from the microprocessor. When in the reversing mode, the microprocessor controls the drive circuit and motor control output to cause the motor to increase speed in one direction in a ramp-like fashion until set speed is reached, hold that set speed for a predetermined time, and then ramp the speed down to zero. The speed control then causes the motor to switch rotational direction and thereafter ramp up to another predetermined set speed, hold that set speed for a known interval, and then ramp down to zero again. The cycle is subsequently repeated for the amount of time input in the time set command or until a stop signal is generated.

The reversing mode advantageously increases the mixing of the components of an assay by increasing the possible locations of each component relative to the other components. The reversing mode enhances the mixing action because heavier and lighter components accelerate and decelerate at different rates thus increasing the mixing and thereby increasing the probability of all molecules of the components commingling with each other in a shorter time period. The speed ramping will cause a differential acceleration while maintaining gentle and reproducible movement of the agitation apparatus. When the apparatus is reversing, the heavier components will overtravel the lighter components and thus add to the dispersion which occurs due to the ramping alone.

These and other objects, features and aspects of the invention will be more fully understood and described when a reading of the detailed description is undertaken in conjunction with the appended drawings wherein:

BRIEF DESCRIPTION OF THE DRAWINGS

FIG. 5 is a detailed electrical schematic diagram of the microprocessor based speed control for the orbital shaker illustrated in FIG. 1;

FIG. 6 is a pictorial representation of the digital code which is produced by the numeric keypad and control keys of the keyboard illustrated in FIG. 5;

FIG. 8 is a series of waveform diagrams illustrating the operation of the speed control loop for the shaker apparatus illustrated in FIG. 1;

Appendix A is a listing of system software forming the speed control.

DETAILED DESCRIPTION OF THE PREFERRED EMBODIMENT

Figure 1:
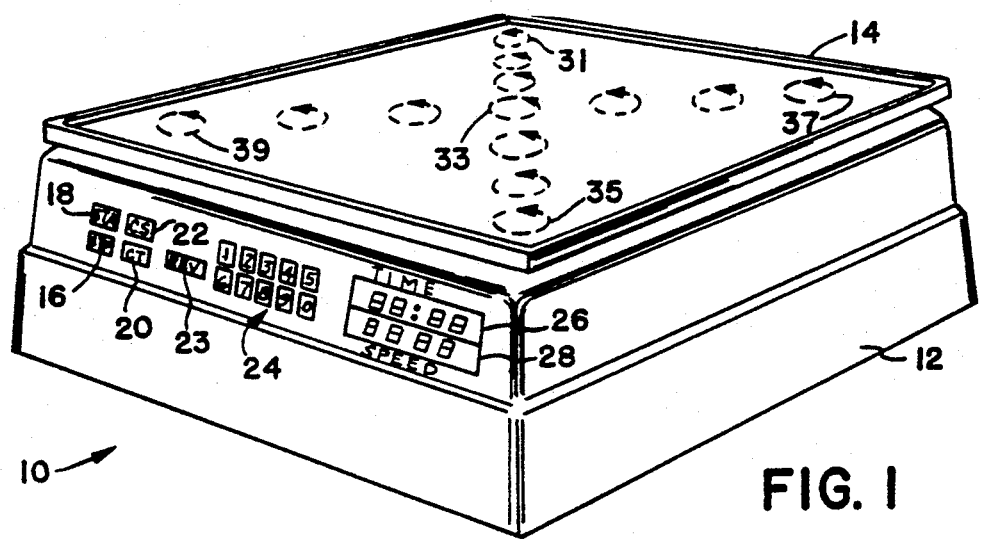
FIG. 1 is a pictorial perspective view of an orbital shaker including a speed control constructed in accordance with the invention.

With respect now to FIG. 1, there is shown an orbital shaker 10 including a speed control constructed in accordance with the invention. The orbital shaker 10 comprises a base 12 incorporating means for providing operator inputs including control keys 16–22, 23 and numeric keypad 24. In addition, a display means comprising a time display 26 and a speed display 28 are provided An operator, by selecting the sequence of control keys and the information input to the displays, causes operation of the apparatus in the manner described hereinafter.

The orbital shaker 10 imparts an exact orbital motion to speciment placed on a tray 14, which in one mode is moved in a prescribed cyclic motion at a particular speed and for a predetermined amount of time. In another mode, the orbital shaker 10 causes tray 14 to be moved in a pres-ribed cyclic motion at constantly changing speeds with its direction of rotation periodically reversed. One important aspect of the apparatus is to impart the same prescribed cyclic motion at each of the corners 31, 35, 37 and 39 of the tray 14 as that imparted is the middle of the tray 33. This is accomplished by preventing the plane of the tray 14 from rotating and constraining it to move only in a combination of its translational modes. In this manner, uniform agitation for the many assays contained on the tray will be assured.

The motion which will be described with respect to the illustrated embodiment will be an orbital motion of a circular nature. However, it should be pointed out that orbital motions which are not circular, such as elliptical, oval or the like, or even more compound shapes are within the scope of the disclosure. Further, it will be seen that in addition to orbital motion, single axis or plural axis translational movements are available from the apparatus and depend only upon the driving means. All of the above described motions can be produced by the illustrated apparatus with precision and without noise as will be more fully explained hereinafter.

The operator control keys comprise five pushbutton switches 16, 18, 20, 22, and 23. The pushbutton 18 is the start button and, assuming all conditions are clear for initiating motion of the tray 14, pressing this button will initiate the agitation operation. The stop button, control key 16, will cause a termination of the motion of the tray 14 prior to a timeout. Control key 23 is the reversing mode key and pressing it will toggle the apparatus between a set speed mode and a reversing mode.

In general, the operator control keys are used to produce input signals which will cause the apparatus to cyclically move the tray at a set velocity for a predetermined period of time in the set speed mode or at varying velocities for a predetermined time with periodic reversing in the reversing mode. The peak velocity which the operator wishes to produce for either mode is input by pressing the change-speed key 22 and then by entering a four digit numerical value with the 0-9 keys of numeric keypad 24. This velocity set point is then displayed in the four digits of the speed display 28 in revolutions per minute (RPM). The time period for the agitation in the set speed mode or the reversing mode is input to the apparatus by pressing the change-time button 20 and then by entering four numerical values into the numeric keypad 24. This time period is entered into the time display 26 and indicates the amount of time the material in the tray is to be agitated for a particular experiment.

By operating specific combinations of the keys, special functional operations are available. Pressing the change-speed key 22 while simultaneously holding in the 1 or 2 key of the numeric keypad 24 causes the speed of the apparatus to ramp up or ramp down, respectively, while the apparatus is running. Pressing the change-time key 20 while simultaneously holding in the 1 or 2 key causes the digits stored in the time display 26 to be set for hours and minutes in the first instance, and for minutes and seconds in the second instance.

Figure 2:
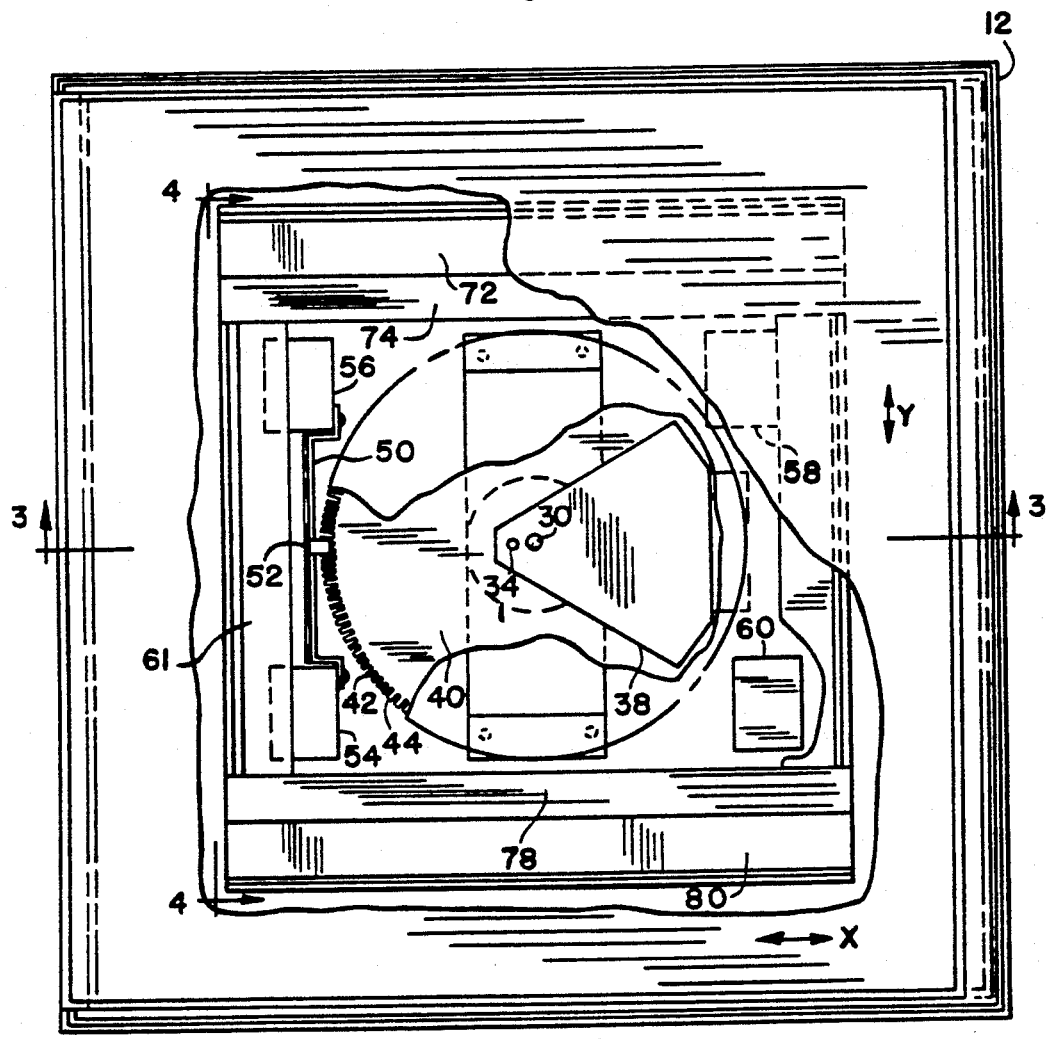
FIG. 2 is a fragmented top view of the orbital shaker illustrated in FIG. 1.
Figure 3:
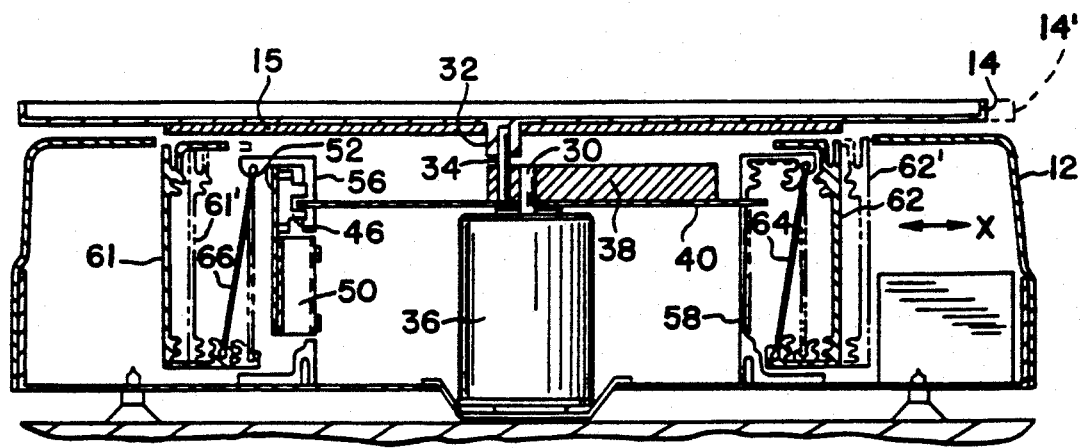
FIG. 3 is a cross-sectional side view of the direct drive mechanism and suspension system of the orbital shaker illustrated in FIG. 1.
Figure 4:
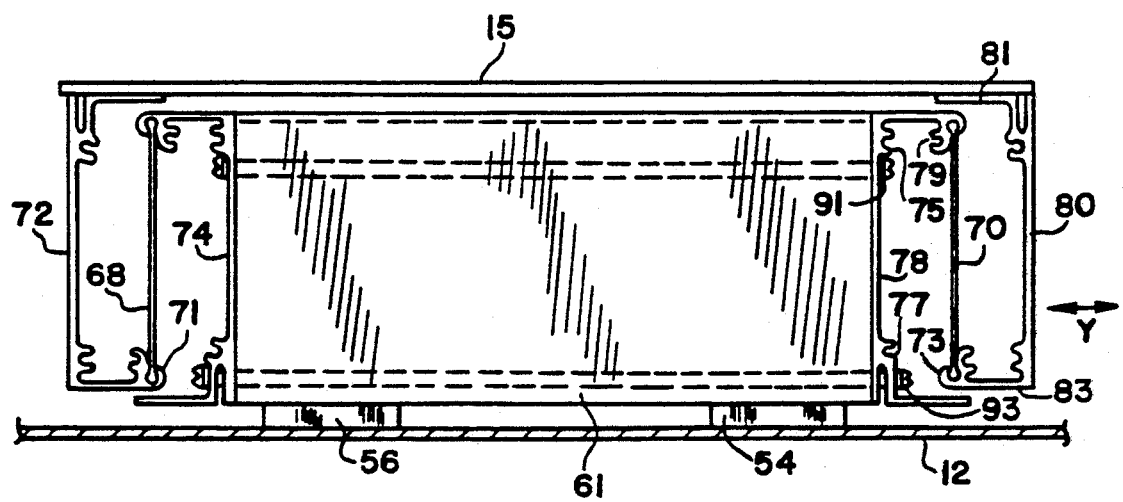
FIG. 4 is a partially cross sectional front view of the suspension system of the orbital shaker illustrated in FIG. 1.

With respect now to FIGS. 2, 3 and 4, the generation of the motion for a circular embodiment of the apparatus 10 will be more fully explained. The motion of the tray 14 is produced by a direct drive including a DC motor 36 (FIG. 3) having a drive shaft 30 substantially perpendicular to the plane of the tray 14. The drive shaft 30 fits into a bore of a counterweight 38 which has an offset or eccentric drive pin 34 substantially parallel to the drive shaft 30. Rotation of the drive shaft 30 by the motor 36 produces an orbit (in the present embodiment the orbit is circular) of the drive pin 34 about the axis of the motor 36. The drive pin 34 is coupled through a backing plate 15 by means of a bushing 32 to the tray 14. This direct drive orbiting of the vertically-oriented axis of the motor 36 and the counterweight 38 produce a smooth continuous orbital motion for the tray 14.

The counterweight 38 is generally about one-half of the maximum load that the tray 14 is designed to hold and thus will substantially balance most loads. The counterweight 38 helps align the center of the entire rotational mass (centroid) over the motor axis. Additionally, the counterweight 38 helps overcome the inertia of the load placed on the tray 14, but does not have to overcome the actual weight of the load because the tray 14 is supported by the backing plate 15 which is mounted on suspension means which bear the weight of the load. The direct drive motor 36 is controlled with a closed loop feedback control to produce precise control of the speed of rotation of drive shaft 30, and, thus, tray 14.

In concert with the control, a large slotted disc 40 (FIG. 2) is mounted between the counterweight 38 and the motor 36 and spins with the rotation of the orbit. An optoelectric slot sensor 46 (FIG. 3) is clamped over the slotted edge portion of the disc 40 and produces a changing level signal for every passage of a slot, for example, slot 42 and slot 44. The optoelectric slot sensor 46 is mounted on a strip mount 52 (FIG. 2) which is fixed to a U-shaped support bracket 50 connected between two stationary support stands 54 and 56.

As better seen in FIGS. 2, 3 and 4, support for the weight of the tray 14 is provided by a generally rectangular frame which is supported at its corners by support stands 54, 56, 58, and 60, which are fixedly secured to the base 12. The frame comprises four generally channel shaped elements 61, 62, 74 and 78 assembled in a rectangular box around the support stands 54, 56, 58 and 60.

The backing plate 15 is suspended on this frame by means of four flexible connections which couple the frame to a backing-plate hanger 72 and backing-plate hanger 80 extending substantially parallel and longitudinally across opposite ends of the backing-plate 15. The hangers 72, 80 are additionally generally channel shaped in cross section and include a mounting means 71 with a slot opening to a narrow neck which is adapted to retain a bead. Coupling the channel shaped elements 74 and 78 to the backing-plate hangers 72 and 80 are flexible links 68 and 70, respectively. Therefore, the backing plate 15 is constrained to move in only one direction, referenced as Y in FIG. 4, with respect to the frame.

In a similar manner, the support frame is suspended from the support stands 54, 56, 58 and 60. As better viewed in FIG. 3, the support stands 56 and 58 provide support for channel shaped elements 61 and 62, respectively. The coupling between the support stands and the channel shaped elements are provided by flexible links 64 and 66 similarly constructed to the flexible links 68, and 70. Therefore, the inner or support frame is constrained to move in only one direction, referenced as X in FIG. 3.

Combinations of the translational movements of the support plate and the frame provide orbital motion of the tray 14 with respect to the base 12. This orbital motion is provided without allowing the tray to rotate in its plane, thereby preventing different accelerations depending upon the position of an object on the tray. All assays at any position on the tray are moved with the same motion.

In FIG. 5 there is shown an electrical schematic diagram illustrating a microprocessor based speed control for the orbital shaker apparatus 10. A microprocessor 100 receives the inputs from the control keys 16-23 and numeric keypad 24 forming a keyboard 102, via its port A lines PA0-PA7. The operator, by pressing keys on the keyboard 102, thereby inputs commands and information for the different functions of the system. The microprocessor 100 through port B lines, PB0-PB7, and a port C line, PC3, communicates with the display means 106 via a driver circuit 104. The driver circuit 104 controls the specific elements of the seven-segment displays which are lit up relative to the data that is transmitted. The driver circuit 104 controls both the time display 26 and the speed display 28 of the display means 106.

One basic function of the microprocessor 100 is to provide a closed loop control for the orbital speed of the tray 14. It accomplishes this function by providing a logic level motor control signal from the C port line, PC0. This motor control signal is transmitted through a filter, comprising a resistor 134 and a capacitor 132, to the base of a driver transistor 130. The driver transistor 130 is an NPN power transistor having its collector tied to one terminal of the motor coil 126 and its emitter terminal connected to ground. The other terminal of the motor coil 126 is connected to a source of drive voltage ++V. A diode 128 is paralleled with the motor coil 126 such that when the transistor 130 switches off the inductive energy will be dissipated in the diode.

The microprocessor 100 produces a digital signal output on the control line PC0 which is amplified by the driver power transistor 130 to switch the motor coil 126 either fully on or fully off. This type of on/off control, typically termed a "bang-bang" type of speed control causes the motor 36 to accelerate at the maximum rate determined by the voltage ++V when the transistor 130 is on and to freewheel or decelerate when the transistor 130 is off. The filter comprising resistor 134 and capacitor 132 rounds the edges of the square wave to provide a smooth transition between the switching levels. The control signal PC0 is switched on in response to a state where the actual motor velocity, is below a desired velocity, and the control signal is switched off if the actual motor velocity is in excess of a desired velocity.

The actual velocity of the motor is determined by the microprocessor 100 through the input of an actual speed signal to its interrupt terminal INT. The signal is generated by the optoelectric slot sensor 46 which senses the discontinuities in the slotted disc 40 to provide the interrupt signal. The optoelectric slot sensor 46 includes an IR emitting diode (IRD) 116 which is connected between a source of positive voltage +V and ground via a resistor 118. The optoelectric slot sensor 46 further includes a phototransistor 120 mounted on the other side of the disc 40. The phototransistor 120 is of the NPN type and is connected by its collector to a source of positive voltage +V and by its emitter to ground through a resistor 122.

Normally, the emission of IRD 116 is blocked by the disc 40 from the photo-receptive base area of the phototransistor 120. When a slot in the disc 40 appears in the channel between the IRD and phototransistor 120, the transistor receives emissive radiation from the IRD 116 and begins to conduct current. This conduction will produce a voltage on resistor 122 which is interpreted as an interrupt by the microprocessor 100. The microprocessor 100 by determining the time between the interrupt pulses can thereby calculate the actual velocity of the motor.

Bidirectional control of the rotation of the motor 36 is provided by a relay having switching contacts 136 and 138 and solenoid coil 140. The relay contacts 136 and 138 are connected as a double pole, double throw switch between the motor coil 126 and two sets of contacts paired on either side of the diode 128. The solenoid coil 140 is connected between the emitter of an NPN power transistor 142 and ground. The power transistor 142, collector is tied to a positive voltage +V and the power transistor 142 base is to the port C output PC1, which causes current to flow through the solenoid coil 142 when the transistor is conducting. The power transistor 142 is operated by a high level logic output from the port C output line, PC1, of the microprocessor 100, thereby causing the relay to switch the contacts 136, 138 from one set to the other. When the contacts are switched, current flows in the opposite direction to that previously flowing in coil 126, thereby reversing the direction of rotation of the motor 36.

The microprocessor 100, by controlling the logic levels on the port C output lines, PC0, PC1, determines whether the motor 36 is off or on and, if on, the direction of its rotation. In the illustrated embodiment, a high-level logic signal on PC0 turns the motor 36 on and a low level logic signal turns the motor off. A high-level logic signal on output line PC1 causes the motor 36 to turn in a clockwise direction and a low level logic signal causes the motor to turn in a counter-clockwise direction.

The microprocessor 100 also controls a beeper 112 with an on/off logic level signal generated by the port C control line, PC2. The beeper 112 is used as an audio feedback to alert the user to various conditions, such as pressing any key, an error, or upon the end of the time cycle. The microprocessor 100 contains a programmable read-only memory which can be programmed with the system program. A programming terminal Vpp is connectable by a switch 111 to either ground or a source of voltage +V. The programming pin Vpp provides a means for changing the switch 111 to allow for different models of microprocessors. A microprocessor of the type shown is commercially available from the Motorola Corp. of Schaumburg, Illinois as Model No. MC68705P3 or MC6805P3.

Figure 7:
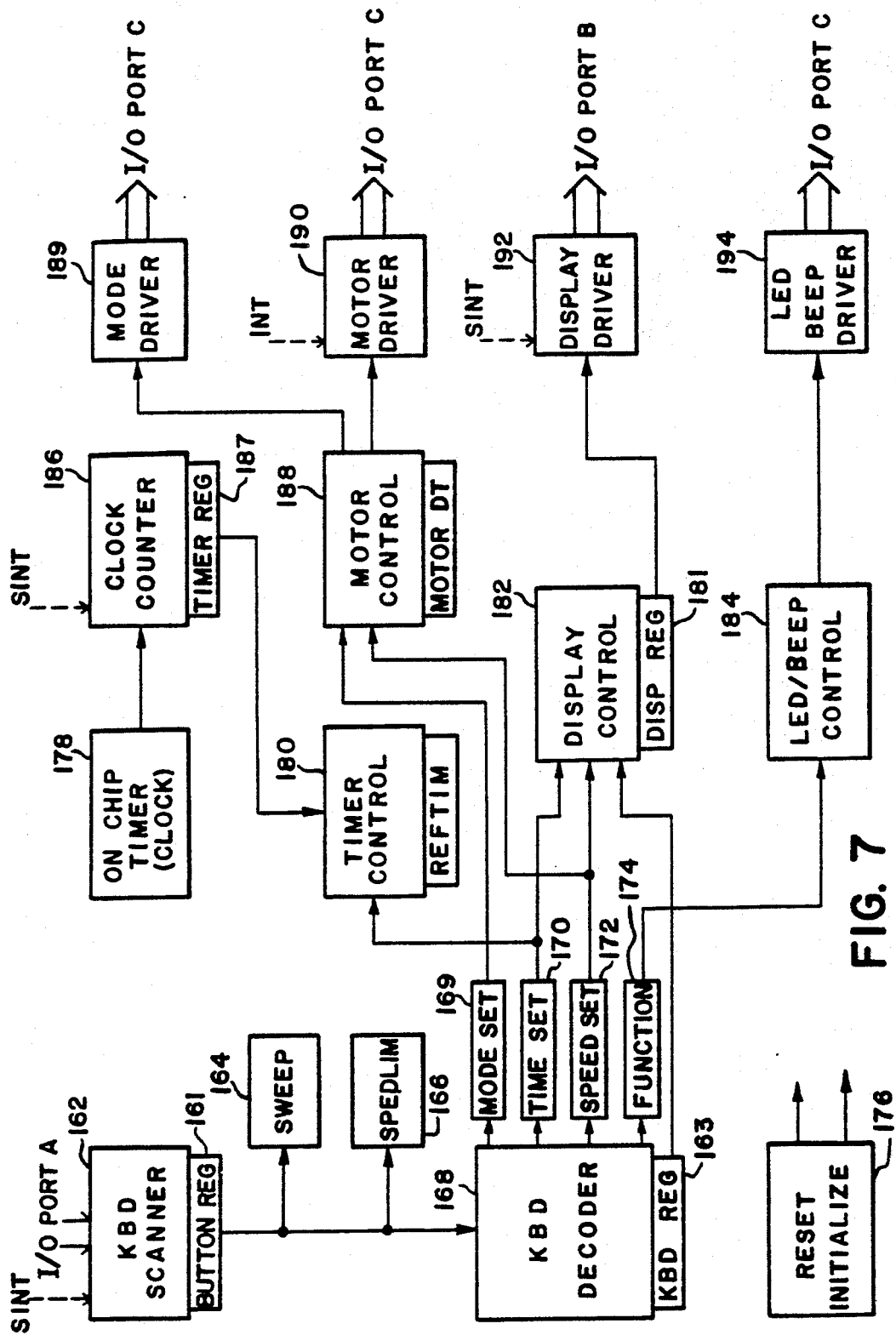
FIG. 7 is a system block diagram of the various routines executed by the microprocessor to control the orbital shaker illustrated in FIG. 1.

A block diagram of the system program which is executed by the microprocessor 100 is more fully disclosed in FIG. 7 where a keyboard scanner subroutine 162 scans the port A inputs PA0-PA7. The button register 161 of the keyboard scanner routine 162 is used to intermediately store the codes coming in from the keyboard 102. Each keyboard key has a separate 8-bit code as is illustrated in FIG. 6 which can be decoded by a keyboard decoder routine 168. The sweep routine 164 monitors the button register 161 and allows the operator to "sweep" or change the set speed of the motor during operation. The speed limit routine 166 monitors the button register 161 and prevents the selection of speeds greater or less than those allowable.

After the bit combinations are decoded by the keyboard decoder routine 168, they are stored in a keyboard register 163. The keyboard decoder routine 168 passes variables as a result of its decoding to a mode set register 169, a time set register 170, a speed set register 172, and a function register 174, The mode set register 169 receives input through the keyboard scanner routine 162 and keyboard decoder routine 168 to determine if the apparatus is to be run in the set speed mode or the reversing mode.

The time set register 170 stores a binary representation of the length of time the operator desires the apparatus to run. This time value is made available to a display control routine 182 and to a timer control routine 180. The display control routine 182 through a display register 181 will use the set time to control a display driver routine 192 which produces a display of the time period remaining for a particular assay in the seven-segment display 26 through port B. Further, the time period is made available to the timer control routine 180 so that the routine can be used in combination with clock counter 186 to determine precisely the amount of time that a certain assay should be run.

The speed set register 172 receives numeric information from the keyboard 102 through the keyboard scanner routine 162 and the keyboard decoder routine 168 and contains a speed value for the angular velocity of the orbital shaker during the processing of an assay. The routine makes this information available to the display control routine 182 which, through the display register 181, drives the seven-segment LED speed display 28 via port B to display this information. The speed set register 172 is responsive to the change speed control key 22 and the numerical sequence which follows it.

A function register 174 receives input through the keyboard scanner routine 162 and keyboard decoder routine 168 and provides test and default information. If there are numeric sequences which the keyboard decoder routine 168 does not recognize, values which are out of bounds for the apparatus, or inputs other than those acceptable, default and error bits will be generated. In response to these default and error conditions, the function register 174 provides information to an LED/BEEP control routine 184. This control routine produces variables which can be used to drive the LED/BEEP driver 194 through port C. When errors or faults occur, the beeper 112 (FIG. 5) can be driven by the LED/BEEP control routine 184 to alert the operator to the condition. Further, for defaults of invalid operational values, the displays 26, 28 are made to flash with the LED/BEEP control routine 184.

The start and stop button keys 16, 18 cause the keyboard scanner and the keyboard decoder routines 162, 168 to produce a zero time set and a zero speed set, in the case of the stop button, and to start the timer control 180 and motor control 188, in the case of the start button 18. The reset and initialize routine 176 is used once only during power up to produce an initialization of the variables used, to start the other programs, to produce a definition of particular constants, and to load certain registers.

An on-chip hardware timer 178 on the microprocessor chip 100 produces pulses at a predetermined clock rate which can be sensed by the clock counter routine 186 to maintain a real-time clock. The real-time clock can produce a reference time for the starting point of a countdown for a particular test period by transfer of that reference time to the timer control routine 180. Further, the timer control routine 180 can interrogate the time set register 170 for the duration of a particular test. In response to the start button 18 the timer control routine 180, thereafter counts down the test duration and when there is a timeout transfers this information to the motor control routine 188, The motor control routine 188 by determining when a timeout occurs, discontinues the agitation operation. The motor control routine 188 also receives the speed set information and provides a signal indicative of the selected speed of the motor 36. Based on these variables, the motor control routine 188 produces information which can be transferred to a motor driver routine 190 to control the operational state of the motor 36 through port C. Additionally the motor control routine 188 receives the mode information from the mode set register 169 to control the direction of the motor 36 through mode driver routine 189 and port C.

Illustrated in the following Appendix A is the listing of the main monitor loop which calls the routines shown in FIG. 7. Lines 05FE-0613 are the instructions forming the reset and initialize routine 176. It is seen that subroutines RCLKSPD, RCLKCNT, RDISDRV, RKEYSCN and RKBDDEC are called in order during the start up or upon the reset of the system. RCLKSPD resets the clock speed of the on chip timer 178; RCLKCNT resets the timer register 187 in the clock counter routine 186; RDISDRV resets the display driver routine 192; RKEYSCN resets the keyboard scanner routine 162, and RKBDDEC resets the keyboard decoder routine 168. After the control routines have been reset, the main monitor enables the interrupt at line 0610 and then enters a monitor loop which will be constantly executing while the program is running.

The main loop consists of calling the ten listed subroutines at lines 0614-062F. First KBDDEC, the keyboard decoder routine 168, is called. Thereafter, DISPCON and TIMCON, the display control routine 182 and the timer control routine 180, respectively, are called. In succession, SWEEP, the acceleration and deceleration routine 164; CKMODE2, the reversing mode control routine; AUTOSTP, the automatic stop routine; and MOTOR, the motor control routine, 188 are called. This group comprises the main control routines for the keyboard input, motor control, and display control. Next in the main loop BEEP, the LED driver and BEEP control routine 184, is called. CLKSPED, the clock speed set routine is called next, and is followed by COLON to light the diodes between the time digits. This is the basic program loop which receives and generates the necessary information for running the system.

In addition to the main loop, the program has a group of routines which are executed on a timed basis. The microprocessor 100 has provisions for setting a software interrupt SINT which transfers control of the program from the main loop to the interrupt handling routine TIMINTR at line 0634. It is here that the routine CLKCNT, the clock counter routine 186; KEYSCN, the keyword scanner routine 162; and DISDRV, the display driver routine 192 are called periodically. In the present system, the software interrupt is generated 256 times per second.

The hardware interrupt from the speed sensor takes precedence over the software interrupt and calls the motor driver routine 190 to control the speed of the apparatus. After execution of the motor driver routine 190, the microprocessor 100 will either return to the main monitor loop or service the software interrupt, if it is waiting.

Therefore, the execution sequence of the program is once through the initializing routine upon startup or reset and then to the main monitor routine for constant execution. The execution of the monitor routines are interrupted by the software interrupt every 256 times per second, and by the hardware interrupt at times depending upon the speed of the motor. After the interrupts have been serviced the program returns to the execution of the main monitor until stopped.

Figure 11:
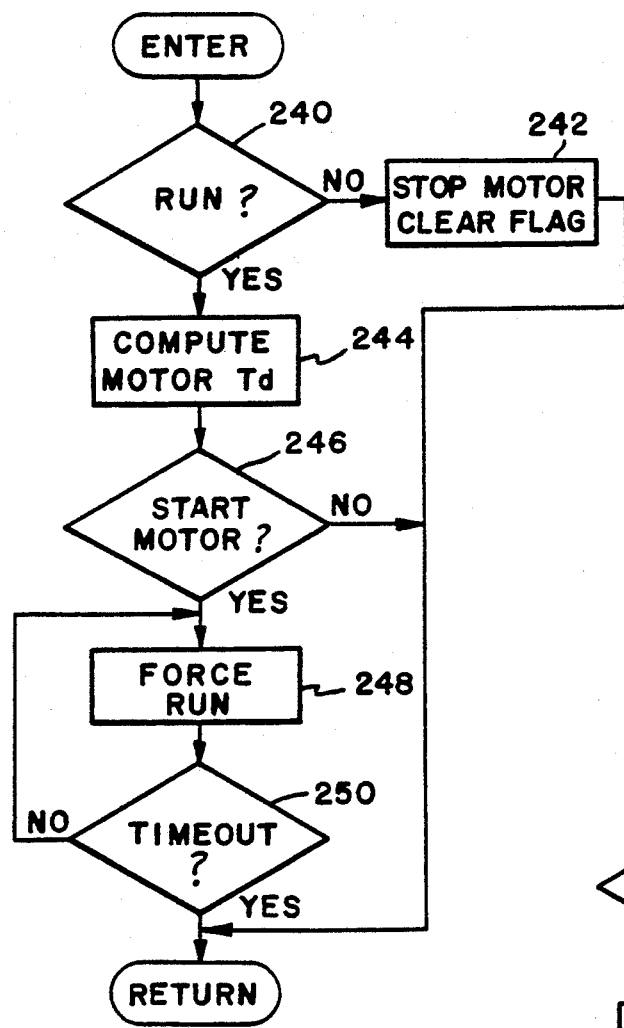
FIG. 11 is a detailed flow chart of the motor control routine illustrated in FIG. 7.
Figure 12:
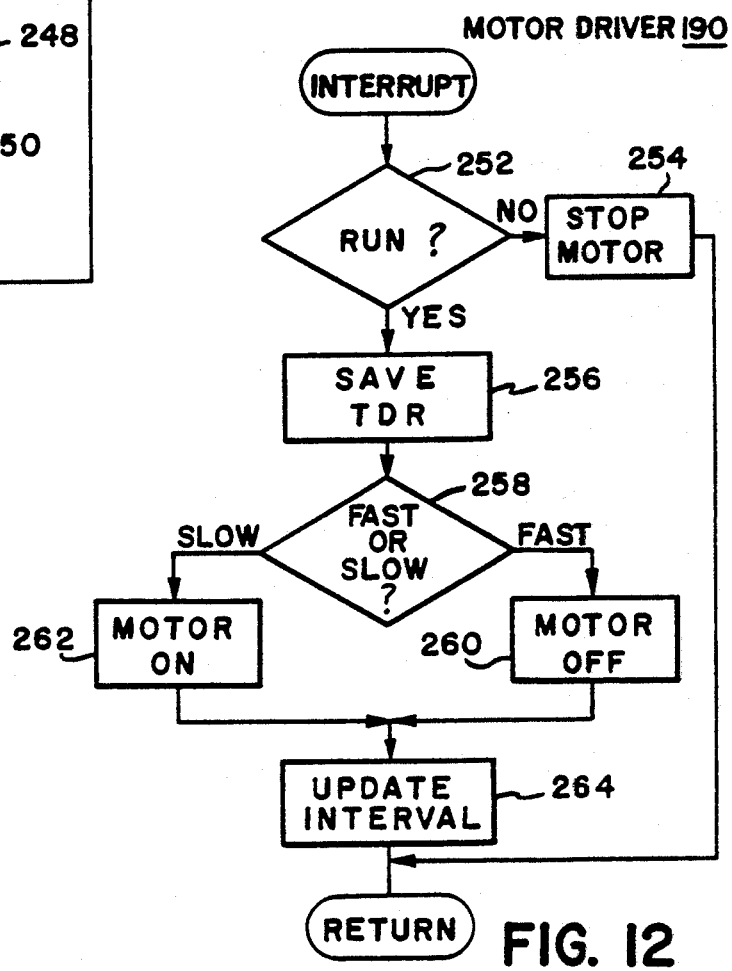
FIG. 12 is a detailed flow chart of the motor driver routine illustrated in FIG. 7.

FIGS. 11 and 12 illustrate detailed flow charts for the motor control routine 188 and motor driver routine 190, respectively. The program listings for these programs are found in Appendix A. Initially, in FIG. 12, the motor control routine 180 reads the bit in common storage where a run flag has been stored in block 240. If the run flag is set, then the program will branch to block 244. If the run flag has not been set, the motor will be stopped by functional block 242 and the run flag cleared. Thereafter, the program will return to the processing of input data from the keyboard and its main loop monitor functions.

When a run flag is detected, the number of clock counts for the speed set point of the motor will be computed in block 244. Next, the program will determine whether the motor is to be started at this time by interrogating a location in memory which indicates whether this is the first time through the program. If not, the program returns, but otherwise, if all conditions are ready for the motor to be started, the motor is forced to run for a short time in block 248. Decisional block 250 will determine if there has been a timeout. A timeout will cause the motor control routine 188 to terminate and return control to the main monitor routines.

The motor driver routine 190 begins in block 252 of FIG. 12 and is essentially a speed control loop called by the hardware interrupt produced from the optoelectric slot sensor 46. The first block determines whether the run flag is set and, if not, the motor is stopped in block 254 and the program returns to the monitor routines. If the run flag is set, then in block 256 the program reads the real-time clock to obtain an indication of the number of clock counts since the last interrupt. This time is stored in the variable TDR. In block 258, the actual time in clock counts is compared to the set time, computed as DT in block 244, to determine whether the motor is operating either too fast or too slow. If the motor is operating too slowly, the program will branch to block 262 where the motor control signal is set to a level which will turn the motor fully on. In the alternative, if the motor is already going faster than the set point, then the control signal is turned off by block 260.

After the control signal has either been set on or off, the separate branches of the program consolidate at block 264 where the reference for the selected time interval is updated. The variable is updated from the motor control routine by adding the time period Td. The program then returns to the location in the monitor routine where the microprocessor 100 was executing instructions prior to the interrupt after performing its control and updating functions. The loop process continues until the next interrupt is generated as previously indicated.

To visualize the manner in which the microprocessor 100 makes the decision whether to turn the motor control signal on or off, consider that the selected or set point speed can be converted into a desired time interval Td based upon the microprocessor clock rate and the slot densities of the disc 40. First calculate a constant K which is the number of clock counts of a high speed clock between each slot in the disc at 1 RPM.

$$K = \frac{Nc \times 60 \text{ sec}/1 \text{ min}}{N}$$

where
Nc = the microprocessor clock rate, for example, 65,536 Hz.
N = number of slots on the disc—for example 180 for a disc with 2° slot increments.
K = 21,845 counts
Now for any selected speed V(SEL) in RPMs, the desired time interval Td, expressed as the number of clock counts between two slots is $$Td = \frac{K}{V(SEL) \text{ RPM}}$$

For a speed range of 40 to 240 RPMs, Td becomes
Td(40) = 546 counts
Td(240) = 91 counts
Upon receiving a change speed command, the set speed entered is converted into the variable Td and stored.

The microprocessor 100 when it receives a hardware interrupt begins a counter clocked at the 65,536 Hz. frequency. When the next interrupt pulse appears, the microprocessor 100 stores the clock count Tf for use as the actual speed.

No the variable X is calculated as $$Tf - Td = X$$

if X > 0 then turn the motor off
if X < 0 then turn the motor on
The controller uses the interval comparison as a convenient and accurate method of controlling the speed of the motor. Since the interrupts occur every 2° of rotation for the motor, the actual speed is calculated 180 times per revolution providing an accurate comparison standard. The program loop for the actual control is additionally executed quickly and permits many control iterations per revolution. The loop is executed in its simplest form by reading two constants, one from the timer register for the actual speed of the motor and the other from memory for the set speed of the motor and then doing the comparison and test steps. The tests and output control signal commands can be accomplished in the same iteration.

At line 05C3 of the motor driver routine, the value of the real time clock, TDR, is saved to memory location SAVETDR. This value is compared to a reference time variable REFTIML, REFTIMH at lines 05CB-05D1 to determine which is greater than the other. The motor control signal is set, as discussed previously, based upon the comparison. Thereafter, the number of clock pulses which should be seen at the selected speed between two interrupts is added to the reference time variable. Thus, for every cycle through the routine the reference time variable is incremented by an incremental clock count MTRDT based on what should be the correct number at the selected speed. This total number should equal the real time clock number TDR if the speed is that desired. If the motor is slow and cycles are being lost then the motor is speeded up until both are equal. If the motor is fast and cycles are being added then the motor is slowed down until both are equal. A speed control for the set speed mode has thus been disclosed.

Waveform diagrams for a control operated in this manner are illustrated in FIG. 8 where the interrupt pulses from the optoelectric slot sensor 46 (FIG. 3) are illustrated as the waveform INT. The motor control signal, output to the driver transistor 130 (FIG. 5), is shown as the waveform labelled PC0. The velocity profile for the motor speed as a function of time is shown in the waveform labelled V where speed set point S1 and speed set point S2 will be used to explain operation of the control.

At the start of an interval, the operator has previously input a time duration over which the agitation will occur. As further input, a speed is set at which he desires the test or agitation to occur, in the example S1, initially. The operator presses the start button and the control thereafter will bring the shaker up to the set point speed and maintain it at that speed precisely for the duration of the interval. The motor starts at rest and therefore the control signal PC0 is set to a high level indicating that the motor is running slower than the set point velocity. This function is provided by the motor control routine 188 (FIG. 7) forcing the interrupts to occur at a motor start so that the motor driver routine 190 can take control.

In response to the high level of the PC0 signal labelled 150, the velocity will begin to ramp at a particular rate shown by the slope of the velocity level 156. As time passes, this velocity level will approach the set point S1 and finally exceed it. When the control senses that the actual velocity has exceeded S1, then the control signal PC0 is set to a low logic level as illustrated at 152. Turning off the drive signal to the motor causes it to freewheel and the velocity to fall at a characteristic slope as shown by 158.

Let us assume at the point which the velocity V exceeds S1, that the set point is changed to S2. The velocity V will therefore, decrease until the motor has slowed to a value below S2 at which time the control signal PC0 will again be set to a high logic level. Thereafter, if the actual velocity exceeds (or, alternatively falls below) the set point S2, the control signal PC0 will oscillate in the opposite manner to provide a limit cycle based upon the two slopes 156 and 158 as shown at 160, FIG. 8.

It is seen that the interrupt signal INT provides a method for determining when the actual velocity V crosses the set point. During the initial acceleration part of the speed cycle (slope 156) the INT pulses begin to come at a higher frequency where two successive pulses 140 and 142 are closer together than the previous two successive pulses. It is seen that at the highest velocity the pulses are the closest together at 144. The pulses then begin to spread out and lower in frequency as the motor slows because of the low logic level on the signal line PC0 as seen at 146 which corresponds to slope 158. Thereafter, when the controller reaches a limit cycle at 160 the corresponding interrupt pulses at 148 are relatively equal in spacing.

This type of controller is termed a "bang-bang" type control where the slope 158 for deceleration is substantially different than the slope for acceleration. This is caused by the manner in which the motor is controlled by the control signal PC0 and the configuration of the motor including the counterweight. The acceleration slope is determined by the full on drive produced by the control when the motor speed is less than the set point. The motor speed then coasts down when the drive is turned at a rate determined by the flywheel effect of the counterweight. This produces an advantageous control which may precisely maintain the speed of the rotation for the specimen tray 14 within ±1% of set point over a range of between 40 and 250 RPM.

Figure 9:
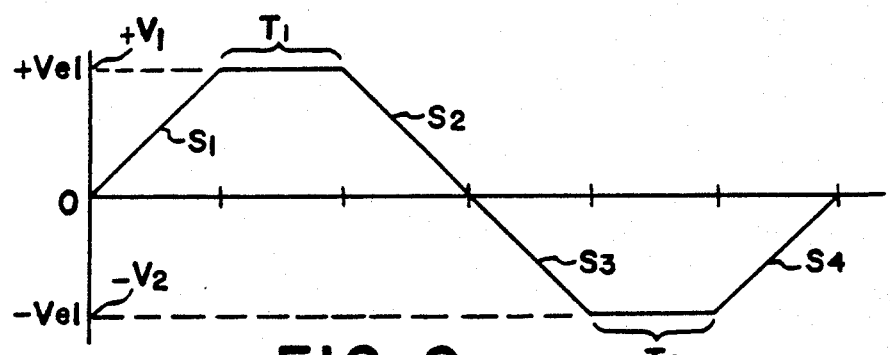
FIG. 9 is a pictorial representation of motor speed as a function of time for the reversing mode of operation of the orbital shaker illustrated in FIG. 1.

FIG. 9 illustrates the waveform of the velocity of the motor 36 as a function of time for the reversing mode. When the apparatus is placed into the reversing mode the cycle shown in FIG. 9 is repeated for the number of hours and minutes, or minutes and seconds, set by the operator during the change-time operation. From a standing start the program will accelerate the apparatus along a slope $S_1$ at a substantially constant speed until it reaches a maximum velocity $+V_1$, at which time that speed will be held for a time $T_1$. After the predetermined time $T_1$ has expired, the velocity of the apparatus will be ramped down according to a constant slope $S_2$. The slope will thereafter, continue until the speed of the apparatus is substantially zero, at which time the motion is reversed and the motor 36 is accelerated in the opposite direction at a constant slope $S_3$. When the apparatus reaches a maximum velocity $-V_2$, it is held at that velocity for a predetermined time $T_2$. Thereafter, the motor is ramped from the velocity $-V_2$ toward zero at a constant slope $S_4$. Once the apparatus reaches substantially zero velocity the cycle repeats.

In this manner a constant agitation is provided by the continuously changing velocities along the slopes $S_1$, $S_2$, $S_3$, and $S_4$. Further a reversal of the directions of the motor provides overtravel for mixing the higher and lower weight components. In this manner two extra mechanisms of agitation are added to the constant velocity rotational agitation provided at the set speeds during time periods $T_1$ and $T_2$. While the cyclical operation during reversing mode shows slopes, time periods, and reversing set point velocities which are equivalent, there is no necessity that any of these parameters must be equal. For example, $S_1$ can be different from $S_2$, $S_3$ and $S_4$. $S_2$ can be different from $S_3$ and $S_4$, and $S_3$ can be different from $S_4$, etc. Similarly $T_1$ does not have to equal $T_2$ nor does $+V_1$ have to equal $-V2_2$. In fact with the motions described for the motor driver routine 190, it is seen that the motor ramps up at a fairly rapid slope and then freewheels down to zero upon decelerations.

Figure 10:
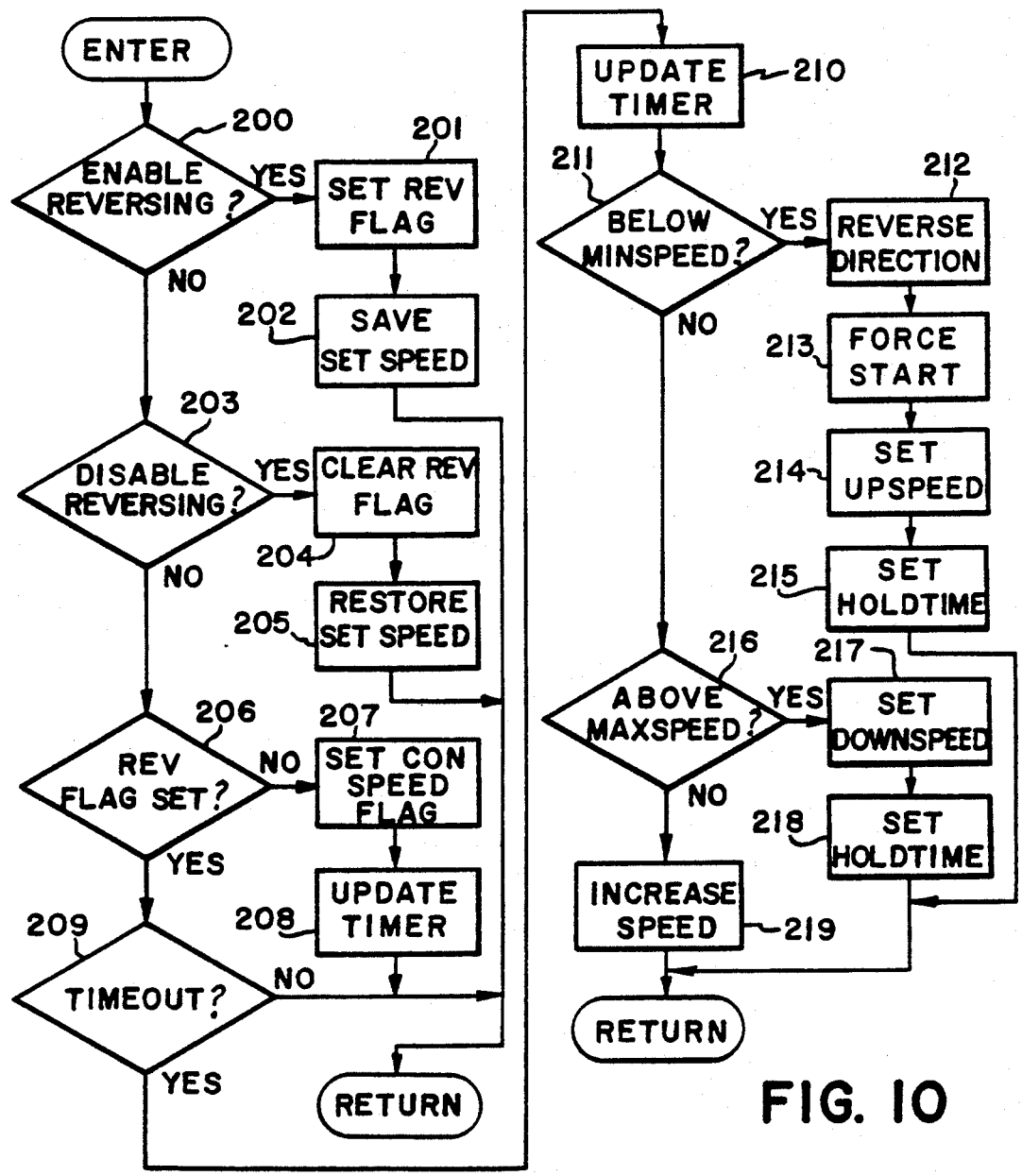
FIG. 10 is a detailed flow chart of the motor reversing mode routine illustrated in FIG. 7.

With respect to FIG. 10 the reversing mode routine will now be more fully described by the operations performed in the flow chart of the figure. When the reversing mode routine is called, it first checks the reversing mode input in block 200 to determine if the reversing mode is to be enabled. If the reversing mode is to be enabled an affirmative branch from block 200 calls blocks 201 and 202 where the reversing flag is set and the set speed is saved in a temporary register, respectively. The program then returns until the next time period. If the reversing mode is not enabled, the next test in block 203 is to determine if it is to be disabled on this pass through the program. An affirmative branch from block 203 causes the execution of blocks 204 and 205 where the reversing flag is cleared and the set speed, stored in the temporary register in block 202, is restored, respectively. The program then returns until the next pass of the main program loop.

In block 206, after determining that the switch settings are not to be handled, the program in block 206 determines if the reversing flag has been set. If the reversing flag has not been set then in block 207 the constant speed flag is set and the timer is updated in block 208 before exiting the routine. However, if the reversing flag has been set, then in block 209 the program checks for a timeout. If there has been a timeout, then the timer is updated in block 210 before continuing to the reversing speed control. If a timeout has not occurred then the program immediately returns and waits for the timeout.

After updating the timer in block 210, subsequent to a timeout the program checks in block 211 to determine if the motor speed is below the minimum speed. This minimum speed is set very close to zero such that the program will be able to determine when to reverse directions. If the speed is below the minimum speed then the program will reverse directions of the motor in block 212 by changing the logic level on port C line PC1. Thereafter, the program in block 213 forces the motor to start or run and the variable upspeed in block 214 is set to indicate the direction of the ramp. Further, in block 215, the hold time for the constant speed intervals at times $T_1$ and $T_2$ is set. The program then exits.

Conversely, if the operation of the motor is not below the minimum speed then the program determines if it is above the maximum speed in block 216. If the motor velocity is not above the maximum speed then in block 219 the speed is increased by an increment or the slope of the particular direction in which the motor is increasing. Once the velocity of the motor increases above the maximum or set speed, it is held for the hold time and then during a particular pass through this program the affirmative branch from block 216 will continue the program in block 217. At this point the program will set the direction of the ramp to the downspeed direction and again set the hold time for when the program will reach the predetermined set speed for times $T_1$ and $T_2$.

While a preferred embodiment of the invention has been illustrated, it will be obvious to those skilled in the art that various modifications and changes may be made thereto without departing from the spirit and scope of the invention as defined in the appended claims.

APPENDIX A

| Addr | Label | Instruction | Comment |
|---|---|---|---|
| 05FE | INITAL | LDAI $FF | |
| 0600 | | STAD PCDDR | |
| 0602 | | JSRE RCLKSPD | |
| 0604 | | JSRE RCLKCNT | |
| 0607 | | JSRE RDISDRV | |
| 060A | | JSRE RKEYSCN | |
| 060D | | JSRE RKBDDEC | |
| 0610 | | CLI | /ENABLE INTERRUPT |
| 0613 | | BSET0 FUNREQ | /BEEP |
| 0614 | LOOP | JSRE KBDDEC | |
| 0617 | | JSRE DISPCON | |
| 061A | ON | JSRE TIMCON | |
| 061D | | JSRE SWEEP | |
| 0620 | | JSRE CKMODE2 | |
| 0623 | | JSRE AUTOSTP | |
| 0626 | | JSRE MOTOR | |
| 0629 | | JSRE BEEP | |
| 062C | | JSRE CLKSPED | |
| 062F | | JSRE COLON | |
| 0632 | | BRA @LOOP | |
| 0634 | TIMINTR | JSRE CLKCNT | |
| 0637 | | JSRE KEYSCN | |
| 063A | | JSRE DISDRV | |
| 063D | | RTI | |
| 063E | RCLKCNT | EQU $4E0 | |
| 063E | CLKCNTH | EQU $4E7 | |
| 063E | RDISDRV | EQU $470 | |
| 063E | DISDRV | EQU $479 | |
| 063E | RKEYSCN | EQU $237 | |
| 063E | KEYSCN | EQU $242 | |
| 063E | RKBDDEC | EQU $270 | |
| 063E | KBDDEC | EQU $270 | |
| 063E | DISPCON | EQU $430 | |
| 063E | TIMCON | EQU $500 | |
| 063E | SWEEP | EQU $540 | |
| 063E | AUTOSTP | EQU $400 | |
| 063E | MOTOR | EQU $580 | |
| 063E | BEEP | EQU $1AB | |
| 063E | COLON | EQU $200 | |
| 063E | RCLKSPD | EQU $D0 | |
| 063E | CLKSPED | EQU $D5 | |
| 05C0 | MTRDRV | LDAD TDR | /SAVE TDR |
| 05C2 | | COMA | |
| 05C3 | | STAD SAVETDR | |
| 05C5 | RUNCHK | LDAD FUNREG | |
| 05C7 | | AND I $80 | |
| 05C9 | | BEQ @OFF | |
| 05CB | COMPUTE | LDAD REFTIML | /FIND |
| 05CD | | SUBD SAVETDR | /ERROR |
| 05CF | | LDAD RFFTIMH | |
| 05D1 | | SBCD TIMERL | |
| 05D3 | | BPL @OFF | |
| 05D5 | ON | BSET0 PCDATA | /SPEEDUP |
| 05D7 | | BRA @UPDATE | |
| 05D9 | OFF | BCLR0 PCDATA | /SLOWDOWN |
| 05DB | UPDATE | LOAD SAVETDR | |
| 05DD | | ADDD MTRDTL | |
| 05DF | | STAD REFTIML | |
| 05E1 | | LDAD TIMERL | |
| 05E3 | | ADCD MTRDTH | |
| 05E5 | | STAD REFTIMH | |
| 05E7 | | RTI | |
| 05E8 | FUNREG | EQU $23 | |
| 05E8 | TIMERL | EQU $2B | |
| 05E8 | SAVETDR | EQU $30 | |
| 05E8 | REFTIMH | EQU $31 | |
| 05E8 | REFTIMH | EQU $32 | |
| 05E8 | MTRTDH | EQU $33 | |
| 05E8 | MTRTDH | EQU $34 | |
| 0578 | MOTOR | LDAD FUNREG | /RUN? |
| 0580 | | ANDI $80 | |
| 0582 | | BEQ @STOP | |
| 0584 | | LDAD SPEDSET | |
| 0586 | | BEQ @STOP | |
| 0588 | COMPUTE | STAD MD | |
| 058A | | LDXI HIFACTR | |
| 058C | | LDAI LOFACTR | |
| 058E | | JSRE DIV | |
| 0591 | | CLRX | /TIMES 4 |
| 0592 | | LSLA | |
| 0593 | | ROLX | |
| 0594 | | LSLA | |
| 0595 | | ROLX | |
| 0596 | | STAD MTRDTL | |
| 0598 | | STAD MRTDTH | |
| 059A | START | TSTD FLAG | |
| 059C | | BNE @EXIT | |
| 059E | | INCD FLAG | |
| 05A0 | | LDAD TIMERLO | |
| 05A2 | | ADDI $40 | /START DELAY |
| 05A4 | LOOP | BSET0 PCDATA | |
| 05A6 | | CMPD TIMERLO | |
| 05A8 | | BNE @LOOP | |
| 05AA | | RTS | |
| 05AB | STOP | BCLR0 PCDATA | |
| 05AD | | CLRD FLAG | |
| 05AF | EXIT | RTS | |
| 05B0 | FUNREG | EQU $23 | |
| 05B0 | SPEDSET | EQU $29 | |
| 05B0 | TIMERLO | EQU $2B | |
| 05B0 | MTRDTH | EQU $33 | |
| 05B0 | MTRDTL | EQU $34 | |
| 05B0 | FLAG | EQU $35 | |
| 05B0 | DIV | EQU $95 | |
| 05B0 | MD | EQU $10 | |
| 05B0 | HIFACTR | EQU $15 | |
| 05B0 | LOFACTR | EQU $55 | |
| 0540 | SWEEP | LOAD FUNREG | /RUN |
| 0542 | | ANDI $80 | |
| 0544 | | BEQ @DONE | |
| 0546 | | LOAD TIMERLO | /TIMEOUT? |
| 0548 | | SUBD TREF | |
| 054A | | ANDI $FC | |
| 054C | | BNE @DONE | |
| 054E | | LOAD TIMERLO | /UPDATE |
| 0550 | | ADDI $08 | |
| 0552 | | STAD TREF | |
| 0554 | UPCHK | LOAD BUTTON | |
| 0556 | | CMPI UPCODE | |
| 0558 | | BNE @DWNCHK | |
| 055A | | LDAI $F0 | /240? |
| 055C | | CMPD SPEDSET | |
| 055E | | BEQ @DONE | |
| 0560 | | INCD SPEDSET | |
| 0562 | | RTS | |
| 0563 | DWNCHK | CMPI DWNCODE | |
| 0565 | | BNE @DONE | |
| 0567 | | LDAI $28 | /40? |
| 0569 | | CMPD SPEDSET | |
| 056B | | BEQ @DONE | |
| 056D | | DECD SPEDSET | |

-continued

APPENDIX A

| | | |
|---|---|---|
| 056F DONE | RTS | |
| 0570 BUTTON | EQU $22 | |
| 0570 FUNREG | EQU $23 | |
| 0570 SPEDSET | EQU $29 | |
| 0570 TIMERLO | EQU $2B | |
| 0570 TREF | EQU $36 | |
| 0570 UPCODE | EQU $A5 | /C-SPEED&2 |
| 0570 DOWNCODE | EQU $C5 | /C-SPEED&1 |
| 0000 CKMODE2 | LDAD BUTTON | |
| | CMPI RUN 2 | |
| | BNE @CKMODE1 | |
| | BSET3 FUNREG | /SET FLAG |
| | LDAD SPDSETL | /SAVE SPEED |
| | STAD SAVSPDL | |
| | LDAD SPDSETH | |
| | STAD SAVSPDH | |
| | RTS | |
| CKMODE1 | CMPI RUN1 | |
| | BNE @CKFLAG | |
| | BCLR3 FUNREG | /CLEAR FLAG |
| | LDAD SAVSPDL | /RESTORE SPEED |
| | STAD SPDSETL | |
| | LDAD SAVSPDH | |
| | STAD SPDSETH | |
| | RTS | |
| CKFLAG | LDAD FUNREG | |
| | ANDI $88 | /RUN & FLAG |
| | CMPI $88 | |
| | BEQ @CKTIME | |
| | BCLR1 PCDATA | /SET CW ROTATE |
| | LDAD TIMERLO | /UPDATE TIMER |
| | STAD REFTIM | |
| | RTS | |
| CKTIME | LDAD TIMERLO | |
| | SUBD REFTIM | |
| | BMI @EXIT | |
| UPDATE | LDAD TIMERLO | |
| | ADDI DELAY | |
| | STAD REFTIM | |
| MINCHK | LDAD SPDSETL | |
| | SUBI MINSPDL | |
| | LDAD SPDSETH | |
| | SBCI MINSPDH | |
| | BGT @MAXCHK | |
| | LDAD PCDATA | /REV DIRECTION |
| | ANDI $02 | |
| | BCLR1 PCDATA | |
| | BEQ @AHD1 | |
| | BSET1 PCDATA | |
| AHD1 | CLRD STRTFLG | /FORCE START |
| | CLRD BUMSPDH | /SET UPSPEED |
| | CLRD BUMSPDL | |
| | INCD BUMSPDL | |
| | LDAD REFTIM | /SET HOLD TIM |
| | ADDI HOLDTIM | |
| | STAD REFTIM | |
| | RTS | |
| MAXCHK | LDAD SAVSPDL | |
| | SUBD SPDSETL | |
| | LDAD SAVSPDH | |
| | SBCD SPDSETH | |
| | BGT @BUMPSPD | |
| | LDAD $FF | /SET DWNSPEED |
| | STAD BUMSPDH | |
| | STAD BUMSPDL | |
| | LDAD REFTIM | /SET HOLD TIM |
| | ADDI HOLDTIM | |
| | STAD REFTIM | |
| | RTS | |
| BUMPSPD | LDAD SPDSETL | |
| | ADDD BUMSPDL | |
| | STAD SPDSETL | |
| | LDAD SPDSETH | |
| | ADDD BUMSPDH | |
| | STAD SPDSETH | |
| EXIT | RTS | |
| / | | |

-continued

APPENDIX A

| | | |
|---|---|---|
| BUTTON | EQU $22 | |
| FUNREG | EQU $23 | |
| SPDSETH | EQU $29 | |
| SPDSETL | EQU $2A | |
| TIMERLO | EQU $2C | |
| STRTFLG | EQU $35 | |
| BUMSPDH | EQU $43 | |
| BUMSPDL | EQU $44 | |
| SAVSPDH | EQU $45 | |
| SAVSPDL | EQU $46 | |
| REFTIM | EQU $47 | |
| HOLDTIM | EQU $80 | /HOLD TIME |
| DELAY | EQU $08 | /STEP DELAY |
| RUN1 | EQU $CC | /0C & C0 |
| RUN2 | EQU $AC | /0C & A0 |
| MINSPDH | EQU $00 | |
| MINSPDL | EQU $18 | /40 RPM |
| / | END | |

What is claimed is:

1. A microprocessor based controller for a direct drive DC motor, comprising:

a microprocessor having at least one input port for receiving digital data, at least one output port for generating digital data, and at least one interrupt line for receiving periodic pulses which cause an interruption of normal program execution sequence;

means for inputting to said input port a digital signal indicative of a desired orbital speed for said motor;

means for inputting to said interrupt line a series of pulses having a frequency indicative of the actual rotational speed of the motor; means for calculating the actual rotational speed of the motor by calculating the time between pulses and dividing by the number of pulses per revolution of the motor;

means for comparing said actual rotational speed of the motor with said desired orbital speed and for generating a motor drive signal from said output port which is one level if the desired orbital speed is less than the actual rotational speed and another level if the desired orbital speed is greater than the actual rotational speed; and a three-terminal device connected to said output port to receive said motor drive signal and connected to said direct drive DC motor to control a flow of electric current through said direct drive DC motor in response to said motor drive signal by turning said motor fully on in response to said one level and fully off in response to said other level.

2. A microprocessor based controller as defined in claim 1 which further includes:

means for inputting to said input port a digital signal indicative of a predetermined duration for driving said motor at said desired speed.

3. A microprocessor as defined in claim 2 which further includes:

a real time clock for generating an indication of the time of an event by reading the elapsed time from the setting of the clock;

means for enabling said comparing means in response to a start signal;

means for comparing said time indication with said predetermined duration to determine when the duration has elapsed after the start signal; and means for disabling said comparing means in response to the predetermined duration elapse after the start signal.

4. A microprocessor based controller as defined in claim 1 wherein:
the acceleration of said motor while fully on is greater than the deceleration of the motor while fully off.

5. A microprocessor based controller as defined in claim 1 which further includes:
means, driven by said output port, for displaying said desired speed.

6. A microprocessor based controller as defined in claim 4 which further includes:
means, driven by said output port, for displaying said desired predetermined time.

7. A speed control for a direct drive DC motor, comprising:
a microprocessor having a control program for execution, at least one input port for receiving digital data, at least one output port for generating digital data, and at least one interrupt line for receiving interrupt signals which cause an interruption of normal control program execution;
means for generating an interrupt signal upon a predetermined increment of angular rotation of the motor;
means for inputting to said input port digital data indicative of a desired speed for the motor;
a high speed clock producing a frequency signal divided into many small time increments;
said control program including means for converting said desired speed data into the number of time increments of said high speed clock that would occur in said predetermined increment of angular rotation of the motor if it ware being operated at said desired speed and means for storing said desired speed number;
interrupt program means for counting the number of time increments of said high speed clock between interrupt signals such that a value indicative of the actual speed of the motor is calculated every predetermined increment of angular rotation;
means for comparing said actual speed value with said desired speed value;
means for generating a motor drive signal from said output port which is one level if the desired speed value is less than the actual speed value and another level if the desired speed value is greater than the actual speed value; and
a three-terminal device connected to said output port to receive said motor drive signal and connected to said direct drive DC motor to control a flow of electric current through said direct drive DC motor in response to said motor signal by turning said motor fully on in response to said one level of the motor drive signal and turning said motor fully off in response to said other level of the motor drive signal.

8. A speed control as set forth in claim 7, wherein said means for generating an interrupt signal includes:
a slotted disk having a plurality of slots and mounted for rotation on the armature shaft of said motor, said slots being equally spaced about the periphery of said disk such that they define equal increments of angular rotation of the motor.

9. A speed control as set forth in claim 8 wherein said means for generating an interrupt signal includes:

a radiation source on one side of said slotted disk;
a radiation sensitive switching device on the other side of said slotted disk, said switching device becoming conductive when a slot permits radiation from said source to pass from one side of the disk to the other and becoming nonconductive when a land between two slots blocks radiation from said source.

10. A speed control as set forth in claim 7 which further includes:
means for inputting to said input port digital data indicative of a predetermined duration for operating said motor at said desired speed.

11. A speed control as set forth in claim 10 which further includes:
means for inputting to said input port digital data indicative of a start signal.

12. A speed control as set forth in claim 11 which further includes:
means for inputting to said input port digital data indicative of a stop signal.

13. A speed control as set forth in claim 12 which further includes:
means for controlling the direction of rotation of the motor.

14. A speed control as set forth in claim 13 wherein said direction controlling means includes:
means, coupled to the three-terminal device for applying said flow of electric current through a drive coil of said motor.

15. A speed control as set forth in claim 14 wherein said direction controlling means further includes:
means for switching a direction of said flow of electric current in response to a direction signal.

16. A speed controller for a shaker apparatus having a base, a tray for supporting articles and moveable relative to the base, drive means for effecting a predetermined cyclical motion of the tray, and suspension means for supporting the tray on the base and for providing two-axis translational movement of the tray while preventing rotation thereof, the suspension means including a plurality of flexible supports loaded in tension and substantially inflexible in predetermined directions, said speed controller comprising:
a direct drive DC motor which is coupled to the drive means and imparts the predetermined cyclical motion by its rotation;
a microprocessor having a control program for execution, at least one input port for receiving digital data, at least one output port for generating digital data, and at least one interrupt line for receiving interrupt signals which cause an interruption of normal control program execution;
means for generating an interrupt signal upon a predetermined increment of angular rotation of the motor;
means for inputting to said input port digital data indicative of a desired speed for the motor;
a high speed clock producing a frequency signal divided into many small time increments;
said control program including means for converting said desired speed data into the number of time increments of said high speed clock that would occur in said predetermined increment of angular rotation of the motor if it were being operated at said desired speed and means for storing said desired speed number;

interrupt program means for counting the number of time increments of said high speed clock between interrupt signals such that a value indicative of the actual speed of the motor is calculated every predetermined increment of angular rotation;

means for comparing said actual speed value with said desired speed value;

means for generating a motor drive signal from said output part which is one level if the desired speed value is less than the actual speed value and another level if the desired speed value is greater than the actual speed value; and a three-terminal device connected to said output port to receive said motor drive signal and connected to said direct drive DC motor to control a flow of electric current through said direct drive DC motor in response to said motor drive signal by turning said motor fully on in response to said one level of the motor drive signal and turning said motor fully off in response to said another level of said motor drive signal.

17. A speed controller as set forth in claim 16 which further includes:

means for reversing a direction of current supplied to said motor in response to said motor drive signal thereby reversing the direction of rotation of said motor.

18. A speed controller as set forth in claim 17 wherein:

said microprocessor outputs a digital direction signal to said reversing means to control the direction of rotation of said motor.

19. A speed controller as set forth in claim 18 wherein said reversing means includes:

a power supply circuit having a source terminal connected to a source of voltage and a ground terminal connected to ground;

the coil of said motor being connected between said source terminal and ground terminal such that the electric current flows therethrough to operate said motor;

a double-pole, double-throw switch means which connects said source terminal to one terminal of said motor coil when operated in a first direction, and connects said source terminal to the other terminal of said motor when operated in a second direction.

20. A speed controller as set forth in claim 19 wherein:

said switch means comprises a set of relay contacts connected as a double-pole, double throw switch; and a relay coil controlled by said direction signal for changing the direction of said switch and thereby the direction of rotation of said motor.

21. A speed controller as set forth in claim 19 which further includes:

control switch means connected in series with said motor coil between said source terminal and said ground terminal; and said control switch means adapted to switch said motor coil on and off responsive to said control signal.

22. A speed controller as set forth in claim 18 wherein said microprocessor control program includes:

means for accelerating said motor with said control signal until the motor reaches a predetermined velocity;

means for holding said motor at said predetermined velocity for a set interval of time; and means for decelerating said motor with said control signal until the motor reaches another predetermined velocity.

23. A speed controller as set forth in claim 22 wherein said microprocessor control program includes:

means for changing the direction of rotation of said motor with said direction signal when the motor reaches said another predetermined velocity.

24. A speed controller as set forth in claim 23 wherein:

said acceleration is made at a constant rate.

25. A speed controller as set forth in claim 23 wherein:

said deceleration is made at a constant rate.

26. A speed controller as set forth in claim 23 wherein:

said acceleration and deceleration are made at different rates.

27. A speed controller as set forth in claim 23 wherein:

said acceleration is made at a constant rate;
said deceleration is made at a constant rate;
said acceleration and deceleration are made at different rates.

28. A speed controller as set forth in claim 23 wherein:

said another predetermined velocity is substantially zero velocity.

29. A speed controller as set forth in claim 23 wherein:

said set interval of time is substantially zero.

30. A speed controller for a shaker apparatus having a base, a tray for supporting articles and moveable relative to the base, drive means for effecting a predetermined cyclical motion of the tray, and suspension means for supporting the tray on the base and for providing two-axis translational movement of the tray while preventing rotation thereof, the suspension means including a plurality of flexible supports loaded in tension and substantially inflexible in predetermined directions, said speed controller comprising:

a direct drive DC motor which is coupled to the drive means and imparts the predetermined cyclical motion by its rotation;

a microprocessor having a control program for execution, at least one input port for receiving digital data, at least one output port for generating digital data, and at least one interrupt line for receiving interrupt signals which cause an interruption of normal control program execution;

means for generating an interrupt signal upon a predetermined increment of angular rotation of the motor;

means for inputting to said input port digital data indicative of a desired speed for the motor;

a high speed clock producing a frequency signal divided into many small time increments;

said control program including means for converting said desired speed data into the number of time increments of said high speed clock that would occur in said predetermined increment of angular rotation of the motor if it were being operated at said desired speed and means for storing said desired speed number;

interrupt program means for counting the number of time increments of said high speed clock between interrupt signals such that a value indicative of the actual speed of the motor is calculated every predetermined increment of angular rotation;

means for comparing said actual speed value with said desired speed value;

means for generating a motor drive signal from said output port which is one level if the desired speed value is less than the actual speed value and another level if the desired speed value is greater than the actual speed value, said one level of the motor drive signal turning said motor fully on and said another level of the motor drive signal turning said motor fully off;

a power supply circuit having a source terminal connected to a source of voltage and a ground terminal connected to ground;

the coil of said motor being connected between said source terminal and ground terminal such that a current flows therethrough to operate said motor;

control switch means connected in series with said motor coil between said source terminal and said ground terminal;

said control switch means adapted to switch said motor coil on and off responsive to said control signal;

means for generating a direction signal from said output port which is one level if the desired motor rotation is clockwise and another level if the desired motor rotation is counter-clockwise; and a double-pole, double-throw switch means which connects said source terminal to one terminal of said motor coil when operated in a first direction, and connects said source terminal to the other terminal of said motor when operated in a second direction, said switch means comprising a set of relay contacts connected as a double-pole, double throw switch; and a relay coil controlled by said direction signal for changing the direction of said switch and thereby the direction of rotation of said motor.

31. A reversing orbital shaker, comprising:
a base;
an electric motor connected to said base;
a suspension system connected to said base;
a table connected to said suspension system to be movably supported thereby and coupled to said electric motor to be driven thereby with respect to said base;
means for sensing a rotational speed of said electrical motor and generating a motor speed signal in response thereto;
means, coupled to said motor speed sensing means to receive said motor speed signal, for controlling said rotational speed of said electric motor in response to said motor speed signal;
means, coupled to said controlling means, for timing said electric motor operating in a first rotary direction and generating a reversing signal when the time interval in which said electric motor operates in said first rotary direction reaches a selected amount; and
means, coupled to said timing means to receive said reversing signal, for reversing a direction of rotation of said electric motor from said first rotary direction to a second rotary direction in response to said reversing signal.

32. A reversing orbital shaker as defined in claim 31, wherein the timing means comprises a counter.

33. An orbital shaker for imparting cyclical motion to an article, comprising:
a base;
a table for carrying the article connected to said base and movable with respect to said base in a first orbital direction and in a second orbital direction opposite said first orbital direction;
an electric motor connected to said table for driving said table in said first orbital direction and said second orbital direction; and
a motor controller connectable to a source of electrical energy to be energized thereby and connected to said electric motor for controlling a flow of electric current to said electric motor for periodically reversing motion of said table from said first orbital direction to said second orbital direction and from said second orbital direction to said first orbital direction.

34. An orbital shaker for imparting cyclical motion to an article as defined in claim 33, wherein said motor controller comprises means for sensing a speed of rotation of said electric motor.

35. An orbital shaker for imparting cyclical motion to an article as defined in claim 34, wherein said means for sensing motor speed comprises a pulse generator for generating pulses at a rate related to said rotational speed of said electric motor.

36. An orbital shaker for imparting cyclical motion to an article as defined in claim 33, wherein said table is subjected to uniform acceleration across the entire table.

37. An orbital shaker for imparting cyclical motion to an article as defined in claim 33, wherein said motor controller comprises means for determining when a selected amount of motion in said first orbital direction has occurred in causing said motor to operate in said second orbital direction in response thereto.

* * * * *

UNITED STATES PATENT AND TRADEMARK OFFICE
CERTIFICATE OF CORRECTION

PATENT NO. : 5,060,151
DATED : October 22, 1991
INVENTOR(S) : Glenn E. MIKYSKA

It is certified that error appears in the above-identified patent and that said Letters Patent is hereby corrected as shown below:

Column 1, line 7, after "June 15, 1987," insert --abandoned,--.

Column 4, line 10, change "microprocessor" to --microprocessor-

Column 4, line 42, after "provided" insert a period.

Column 4, line 47, change "speciment" to --specimens--.

Column 4, line 51, change "pres-ribed" to --prescribed--.

Column 5, line 55, after "embodiment" insert a comma.

Column 6, line 59, change "microprocessor" to --microprocessor-

Column 8, line 2, after "is" insert --tied--.

Column 8, line 56, after "174" change the comma to a period.

Column 9, line 4, after "with" insert --a--.

Column 9, line 53, after "18" insert a comma.

Column 9, line 54, after "180" delete the comma.

Column 9, line 56, after "188" change the comma to a period.

Column 12, line 15, change "No" to --Now--.

Column 12, line 56, change "(FIG. 3)" to --(FIG. 5)--.

UNITED STATES PATENT AND TRADEMARK OFFICE
CERTIFICATE OF CORRECTION

PATENT NO. : 5,060,151
DATED : October 22, 1991
INVENTOR(S) : Glenn E. MIKYSKA It is certified that error appears in the above-identified patent and that said Letters Patent is hereby corrected as shown below:

Column 14, line 25, change "-V2$_2$" to ---V$_2$---.

Column 18, APPENDIX A, lines 17-18 should read as a single line only and be listed in columnar reference with lines 15 and 16, as follows:

```
    RUN2      EQU $AC      /0C & A0
    MINSPDH   EQU $00
    MINSPDL   EQU $18      /40 RPM
```

Column 19, line 36, change "ware" to --were--.

Column 21, line 9, change "part" to --port--.

Column 23, line 49, change "electrical" to --electric--.

Signed and Sealed this

Twenty-third Day of March, 1993

*Attest:*

STEPHEN G. KUNIN

*Attesting Officer*      *Acting Commissioner of Patents and Trademarks*